(12) United States Patent
Donohue (10) Patent No.: US 8,858,111 B2
(45) Date of Patent: Oct. 14, 2014

(54) METHOD AND SYSTEM OF A QUICK-CONNECTOR ASSEMBLY

(76) Inventor: James K. Donohue, Lakeway, TX (US)

( * ) Notice: Subject to any disclaimer, the term of this patent is extended or adjusted under 35 U.S.C. 154(b) by 523 days.

(21) Appl. No.: 12/968,372

(22) Filed: Dec. 15, 2010

(65) Prior Publication Data

US 2012/0155958 A1 Jun. 21, 2012

(51) Int. Cl.
| | |
|---|---|
| *B25G 3/00* | (2006.01) |
| *F16B 21/02* | (2006.01) |
| *F16B 7/14* | (2006.01) |
| *B25G 1/04* | (2006.01) |

(52) U.S. Cl.
CPC .............. *F16B 7/1427* (2013.01); *B25G 1/04* (2013.01); *F16B 21/02* (2013.01)
USPC ............ 403/350; 403/348; 403/349; 403/353

(58) Field of Classification Search
USPC ........... 403/109.5, 109.8, 314, 350, 351, 352, 403/DIG. 4, 353, 348, 360, 245, 246, 300, 403/320, 349
See application file for complete search history.

(56) References Cited

U.S. PATENT DOCUMENTS

| | | | | |
|---|---|---|---|---|
| 3,734,548 A | * | 5/1973 | Kieves ........................... | 403/353 |
| 5,018,901 A | * | 5/1991 | Ferree et al. ................. | 403/349 |
| 5,352,071 A | * | 10/1994 | Cochran et al. .............. | 408/204 |
| 5,407,293 A | * | 4/1995 | Crainich .................... | 403/322.1 |
| 5,522,606 A | * | 6/1996 | Pressley et al. ................. | 279/91 |
| 5,575,409 A | * | 11/1996 | Gruendeman ................ | 222/459 |
| 6,000,888 A | * | 12/1999 | Hartman .................... | 408/239 R |
| 6,045,564 A | * | 4/2000 | Walen .......................... | 606/167 |
| 6,113,586 A | * | 9/2000 | Ouchi .............................. | 606/1 |
| 6,151,810 A | * | 11/2000 | Mukai ............................ | 37/350 |
| 6,443,943 B1 | * | 9/2002 | Ouchi .............................. | 606/1 |
| 7,101,124 B2 | * | 9/2006 | Keightley .................... | 408/204 |
| 7,118,138 B1 | * | 10/2006 | Rowley et al. ............. | 285/332.2 |
| 7,654,483 B1 | * | 2/2010 | Martin et al. ................. | 242/303 |
| 7,774,968 B2 | * | 8/2010 | Nearman et al. ............... | 40/605 |
| 7,794,171 B2 | * | 9/2010 | Park et al. .................... | 403/353 |
| 2005/0042048 A1 | * | 2/2005 | Keightley .................... | 408/204 |

* cited by examiner

*Primary Examiner* — Daniel P Stodola
*Assistant Examiner* — Matthew R McMahon
(74) *Attorney, Agent, or Firm* — Mark E. Scott; Conley Rose, P.C.

(57) ABSTRACT

Quick connector assembly. At least some of the illustrative embodiments involve coupling an implement that has a stem member to the distal end of a pole that defines a long axis. The coupling comprising: inserting the stem member that defines a cross-sectional shape into an exposed aperture of a connector where the exposed aperture defines a cross-sectional shape that corresponds to the cross-sectional shape of the stem member; and then locking the implement into the connector such that the both rotational movement of the implement, and movement parallel to the long axis, is restrained, the locking by turning a cam member associated with the connector less than a full rotation.

14 Claims, 6 Drawing Sheets

METHOD AND SYSTEM OF A QUICK-CONNECTOR ASSEMBLY

BACKGROUND

In the realm of outdoor projects, particularly outdoor home maintenance, many of the tasks that need to be performed are well above ground level. For example, tree branches well above ground level may need to be trimmed, rain gutters cleaned, soffits may need to be brushed (such as to remove spider webs or wasp's nets), and the like.

Many manufacturers mount their specific tools on the end of extendable poles. For example, one may purchase a tree saw specifically designed for trimming trees, the tree saw mounted on the end of an extension pole. However, in most cases the saw is permanently affixed to the distal end of the pole, or a connector specifically designed for the tree saw is permanently affixed to the distal end, and thus the pole cannot be used for other yard maintenance chores.

Other types of extension poles, such as painter's poles, have a connector on the distal end that allows connection of different types of brushes and/or rollers. In most cases, the connections are threaded connections which are not only cumbersome to implement (e.g., multiple revolutions of the pole, the roller, or both), but also become loose with extended use or with torsion applied to the pole.

Thus, a connection assembly which is both easy to operate, and which provides secure fixation of the tool on the distal end of a pole, would provide a competitive advantage in the market place.

BRIEF DESCRIPTION OF THE DRAWINGS

For a detailed description of exemplary embodiments, reference will now be made to the accompanying drawings in which.

NOTATION AND NOMENCLATURE

Certain terms are used throughout the following description and claims to refer to particular system components. As one skilled in the art will appreciate, different companies may refer to components by different names. This document does not intend to distinguish between components that differ in name but not function.

In the following discussion and in the claims, the terms "including" and "comprising" are used in an open-ended fashion, and thus should be interpreted to mean "including, but not limited to . . . ." Also, the term "couple" or "couples" is intended to mean either an indirect or direct connection. Thus, if a first device couples to a second device, that connection may be through a direct connection, or through an indirect connection via other devices and connections.

"Congruent", with respect to cross-sectional shape of apertures as between various components, shall mean that the apertures coincide at all points when superimposed, but two or more apertures being congruent shall not require alignment. In other words, two or more otherwise congruent apertures may be misaligned, and still be congruent apertures.

"Align" or "alignment", with respect to congruent apertures, shall mean that the congruent apertures have the same rotational alignment. For apertures that have symmetry about more than one line perpendicular to an axis of the apertures, alignment shall not be negated by selection of different lines of symmetry.

"Misaligned", with respect to congruent apertures, shall mean that the congruent apertures have different rotational orientations.

"Approximately", with respect to a measured dimension, shall mean that the distance or length within +/− five percent (5%) of the recited distance of length shall still be considered the recited distance or length.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Figure 1:
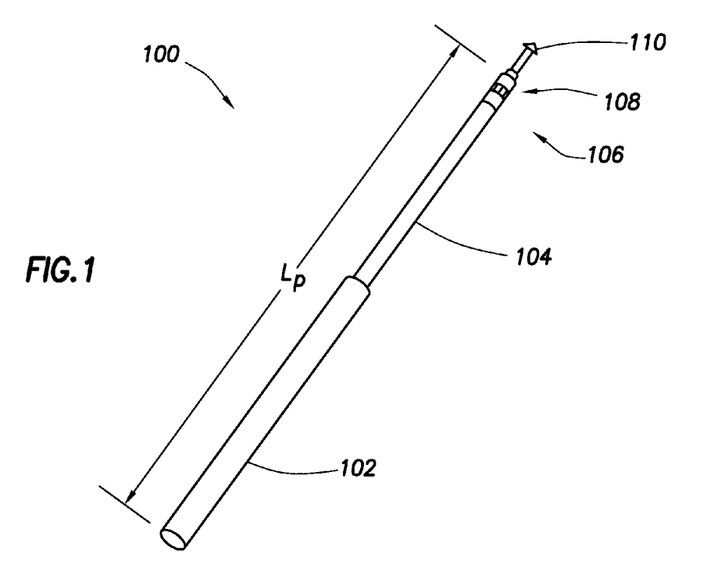
FIG. 1 shows a perspective view of a utility pole with a connector assembly in accordance with at least some embodiments.

The various embodiments are directed to a connector assembly which is useful in connecting and disconnecting various tools or implements to the end of a utility pole. FIG. 1 shows a perspective view of the utility pole 100 in accordance with at least some embodiments. In particular, the utility pole 100 comprises a proximal pole portion 102 and a distal pole portion 104. In accordance with at least some embodiments, the distal pole portion 104 is telescopically engaged with the proximal pole portion 102 such that the overall length of the utility pole 100 (the length labeled $L_P$ in FIG. 1) may be adjustable. In accordance with at least some embodiments, at least a portion of the utility pole 100 is constructed of a non-conductive material, such as fiberglass or plastic. In some cases, the entire utility pole 100 is constructed of a non-conductive material. Combinations of conductive and non-conductive materials may be equivalently used.

The distal end 106 of the utility pole 100 further comprises a connector assembly 108. The connector assembly 108 in accordance with the various embodiments is designed and constructed such than an implement 110 can be quickly connected and disconnected from the utility pole 100. The implement 110 is illustratively shown as a sharpened spike, which may be used, for example, to test for wood rot on facie boards of homes. It is to be understood, however, that the implement 110 in the form of a sharpened spike is merely illustrative of any implement which may need to be attached to the distal end of the utility pole, such as, but not limited to, hooks, brooms, rakes, and saws, just to name a few.

Figure 2:
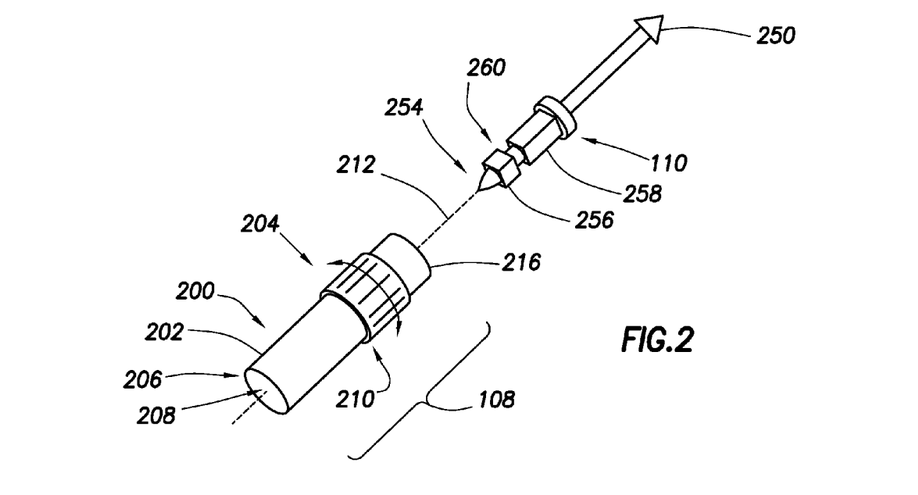
FIG. 2 shows a perspective view of the connector assembly and implement in accordance with at least some embodiments.

FIG. 2 shows in greater detail the connector assembly 108 in accordance with some embodiments. In particular, the connector assembly 108 comprises a lower shaft member 200 having an outer wall 202 that defines a distal end 204 (the full distal end 204 not visible in FIG. 2), a proximal end 206 and an internal volume 208 of circular cross-section.

The connector assembly 108 further comprises a cam member 210 telescoped over the distal end 204 of the lower shaft member 200. Cam member 210 is configured to rotate about a central axis 212, which the cam member 210 shares with the lower shaft member 200. As will be discussed more thoroughly below, rotation of the cam member 210 in a first direction acts to lock an implement 110 into the connector assembly 108, and rotation of a cam member in a second, opposite direction acts to unlock an implement 110 from the cam member 108 such that the implement 110 may be removed. Finally, in at least some embodiments the connector assembly 108 comprises a top cap 216 telescoped into the cam member 210, the top cap 216 coupled to the lower shaft member 200. The coupling mechanism between the lower shaft member 200 and the top cap 216 is hidden from view in FIG. 2 by the cam member 210, but illustrative coupling mechanisms will be discussed more thoroughly below.

Figures 3, 4, 5:
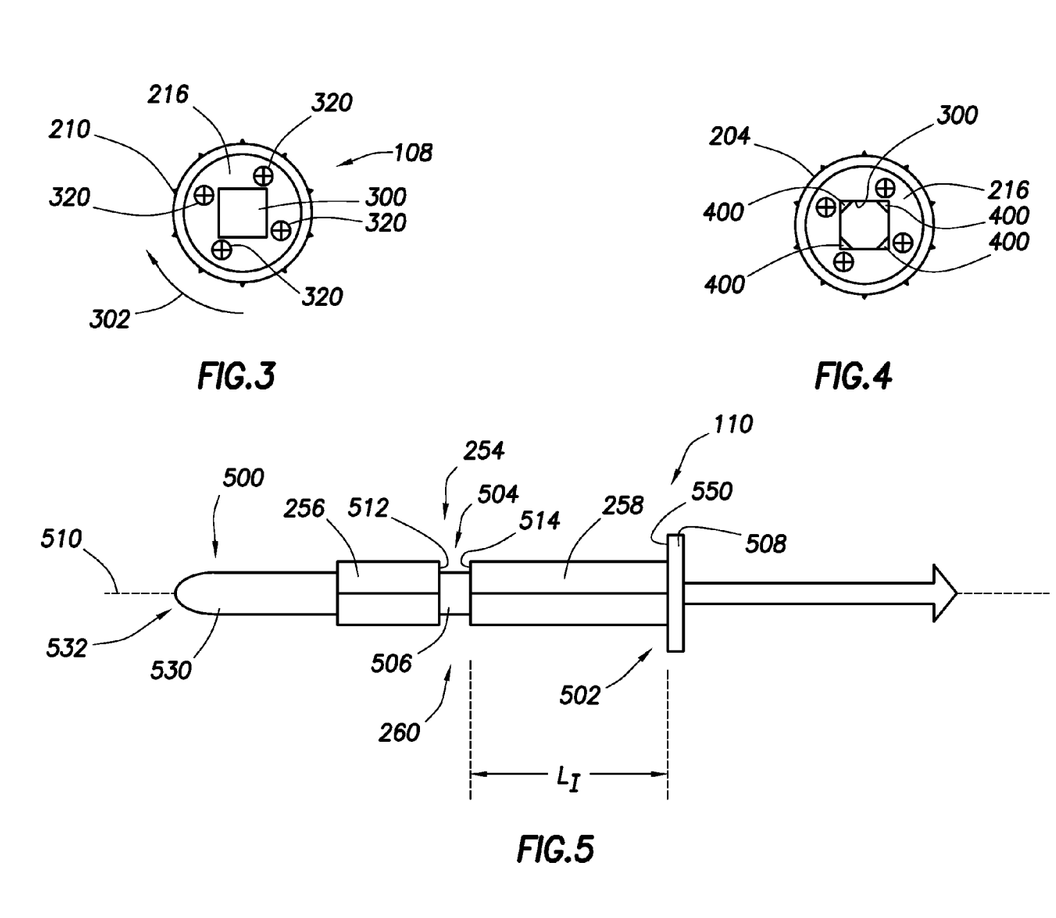
FIG. 3 shows an overhead view of the connector assembly in accordance with at least some embodiments.
FIG. 4 shows an overhead view of the connector assembly in accordance with at least some embodiments.
FIG. 5 shows a side elevation view of an implement, including a stem member, in accordance with at least some embodiments.

FIG. 3 shows a top plan view of the connector 108 in accordance with at least some embodiments. In particular, visible in FIG. 3 is the top cap 216, along with portions of the cam member 210. FIG. 3 shows an aperture 300 that extends through the top cap 216. Not visible in FIG. 3 is a congruent aperture through a plate member of the cam member 210 (also discussed more thoroughly below) and a congruent aperture in a flange member of the lower shaft member 200 (also discussed more thoroughly below). In accordance with at least some embodiments, top cap 216 couples to the lower shaft member by a set of fasteners 320. The illustrative embodiments of FIG. 3 use four such fasteners 320, but greater or fewer numbers of fasteners may be equivalently used.

In the view of FIG. 3, the congruent apertures of the cam member 210 and the lower shaft member are aligned and are not visible. Thus, in the embodiments illustrated by FIG. 3, with the aperture of the cam member 210 rotationally aligned with the aperture 300 in the top cap 216, no portion of the aperture of the cam member 210 occludes the aperture 300, and thus the cam member 210 does not impede the insertion or removal of the stem member 254 of an implement 110 (FIG. 2). However, in accordance with the various embodiments rotation of the cam member 210 (the rotation shown by arrow 302) results in misalignment of the apertures as between the cam member 210 and the aperture 300 in the top cap 216.

FIG. 4 shows an overhead plan view of the connector assembly 108. However, in the view of FIG. 4 the cam member 210 has been rotated such that the aperture associated with the plate of the cam member 210 is misaligned with the aperture 300 of the top cap 216. In the illustrative case of an aperture 300 in the form of a square and a corresponding square aperture in the plate of the cam member 210, rotation of the cam member 210 results in the straight sides of the corresponding square aperture of the cam member 214 rotationally misaligned with the aperture 300 such that the sides 400 at least partially occlude a portion of the aperture 300.

Referring simultaneously to FIGS. 2 and 4, FIG. 2 shows the implement 110 (again, in the form of a sharpened point 250), but also including a stem member 254 that illustratively comprises a first insert portion 256 on a distal end of the stem member 254, and a second insert portion 258 on a proximal end of the stem member 254. In the case of the implement 110 to be operational with the connector assembly 108 as seen in FIG. 4, both the first insert portion 256 and second insert portion 258 define a cross-sectional shape that is the same as the cross-sectional shape in the aperture 300 of the top cap 216. As shown, the cross-sectional shape of the two insert portions 256 and 258, as well as the cross-sectional shape of the aperture 300, is a quadrilateral, and more particularly a square. However, and as discussed more thoroughly below, other cross-sectional shapes may be equivalently used. The stem member 254 of the illustrative implement 110 further comprises a shoulder area 260. In the illustrative case of stem member 254, the shoulder area 260 is defined by an annular channel that circumscribes the stem member 254 in the medial portion between the first insert portion 256 and second insert portion 258.

FIG. 5 shows a side elevational view of the illustrative implement 110 in greater detail. In particular, FIG. 5 shows the first insert portion 256 on the distal end 500 of the stem member 254. Likewise, FIG. 5 shows the second insert portion 258 on the proximal end 502 of the stem member 254. Further, FIG. 5 shows the shoulder area 260 disposed medially on the stem member 254 between the first and second insert portions 256 and 258. In the illustrative case of FIG. 5, the shoulder area 260 is defined by an annular channel 504 such that portion 506 of the stem member 254 defines a circular cross section. Finally, FIG. 5 illustrates an alignment stem 530 extending beyond the first insert portion 256. The alignment stem defines a central axis that is coaxial with axis 510, and alignment stem 530 further defines snub nose 532 on the distal portion of the alignment stem 530.

Referring simultaneously to FIGS. 3, 4 and 5, in the rotational orientation of the cam member 210 in FIG. 3, the congruent apertures of the various components of the connector assembly 108 are aligned such that the stem member 254 of the illustrative implement 110 of FIG. 5 may be telescoped into the aperture 300, with the direction of travel perpendicular to the plane defined by the page. Once the stem member 254 is inserted to the point where the backing flange 508 abuts the top cap 216, the cam member 210 is rotated such that the aperture of the cam member 210 misaligns with the aperture of the top cap 216 (shown in FIG. 4). The misalignment of the apertures causes the illustrative sides 400 (FIG. 4) to interact with the shoulder area 260 shown in FIG. 5. More particularly, in the illustrative case of the apertures being squares, the straight sides 400 of the aperture associated with the cam member 210 interacts with the shoulder area 260 to prevent movement of the implement 110 along its long axis 510. More particularly still, the misaligned portions of the aperture associated with the cam member 210 interact at least with the shoulders 512 that abut the first insert portion 256 to prevent movement of the implement 110 along its long axis 510.

In the illustrative case of FIG. 5, the backing flange 508 prevents further axial movement of the stem member 254 into the aperture 300, and thus having a cross-sectional shape of the second insert portion 258 being the same as the cross-sectional shape of the first insert portion 256 is not strictly required. However, in embodiments that implement the second insert portion 258, thus defining additional shoulder regions 514, the backing flange 508 may be omitted for locking purposes, as the interaction between the shoulder 514 and the misaligned portions of the aperture associated with the cam member 210 would prevent further axial movement of the stem member 254 into the aperture. Presence of the backing flange 508, however, helps ensure alignment of the shoulder area 260 with the aperture associated with the cam member 210. The axial length of the second insert portion 258 (as measured between the abutting face 550 of the backing flange and the shoulder 514) is labeled in FIG. 5 as $L_I$.

Figure 6:
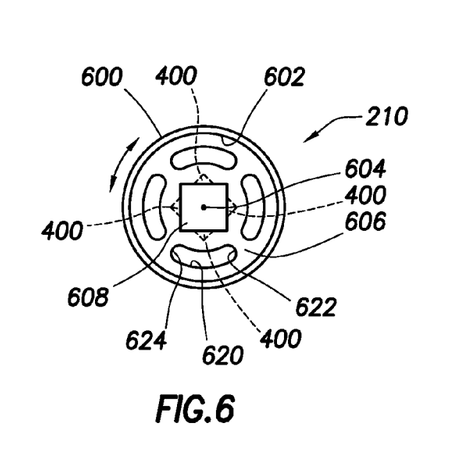
FIG. 6 shows an overhead view of a cam member in accordance with at least some embodiments.

FIG. 6 shows an overhead plan view of a cam member 210 in accordance with at least some embodiments. In particular, the cam member 210 defines an outer body 600. As shown, the outer body 600 defines a circular outside cross-sectional shape, but other outside cross-sectional shapes may be equivalently used. Further, the outer body 600 defines an internal diameter 602, where the internal diameter also defines a circular cross-section. Inasmuch as the cam member 210 telescopes over the lower shaft member 200, the internal diameter of the internal diameter 602 would be slightly greater than the outside diameter of the lower shaft member. In some cases the inside diameter of the internal volume 602 will be a few thousandth of an inch larger. The inside diameter defines a central axis 604, which in the view of FIG. 6 is perpendicular to the page. In the illustrative case of the outside diameter of the outer body 600 defining a circular cross-section, that circular cross-section likewise defines a central axis coaxial with axis 604.

The cam member 210 further comprises a plate 606 disposed within the internal diameter 602. The plate 606 defines a plane that is parallel to the page in the view of FIG. 6, and the plane is perpendicular to axis 604. In some embodiments, the plate 606 is disposed medially within the outer body 600 with respect to the central axis 604; however, the functions performed by the plate 606 (discussed more thoroughly below) may be performed equally well regardless of the location of the plate 606 within the internal diameter 602.

Still referring to FIG. 6, the plate 606 defines an aperture 608. The aperture 608 defines a central axis that is coaxial with axis 604. As illustrated in FIG. 6 the aperture 608 is a quadrilateral, and more particular a square, congruent with the aperture 300 in the top cap 216 (FIG. 3). Moreover, the shape of the aperture 608 matches the cross-sectional shape of the first insert portion 256, but the aperture 608 is not congruent to the cross-sectional shape of the first insert portion 256, as the insert portion 256 is slightly smaller to enable the stem portion 254 to telescope through the aperture 608. As discussed above, in one rotational orientation of the cam member 210 the aperture 608 aligns with the aperture 300 in the top cap 216 and an aperture in the lower shaft member 200 (discussed more thoroughly below), and thus presents no impediment to the insertion of the stem member 254 of the illustrative implement 110. However, in a second rotational orientation of the cam member 210, the aperture 608 is misaligned with the aperture 300 in the top cap 216 and the aperture in the lower shaft member 200. The portions 400 of the plate member that become visible, and interact with the shoulder area 260, are shown in FIG. 6 in dashed form.

Still referring to FIG. 6, the illustrative plate 606 further comprises a channel 620. In the illustrative case of FIG. 6, four such channels 620 are shown; however, the discussion continues with respect to channel 620 as illustrative of all four channels. In particular, channel 620 defines a first end 622 and a second end 624. In the illustrative case of FIG. 6, the length of the channel 620 (as measured between radials emanating from the central axis 604) is less than half a total circumferential length at that distance from the central axis 604, and as specifically illustrated 90 degrees or less. However, fewer channels could be used, in which case the circumferential length could be longer. Likewise, more channels could be used, in which case the circumferential length could be shorter. The illustrative channels 620 work in conjunction with stems that extend between the top cap 216 and the lower shaft member 200 (the stems discussed more thoroughly below). However, the channels 620 in combination with the stems define the extent of rotational possible for the cam member 210. In accordance with at least some embodiments a stem member within the channel 620 and abutting the end 622 defines the first rotational orientation, and the same stem member in the channel 620 abutting the second end 624 defines the second rotational orientation of the cam member 210.

Figure 7:
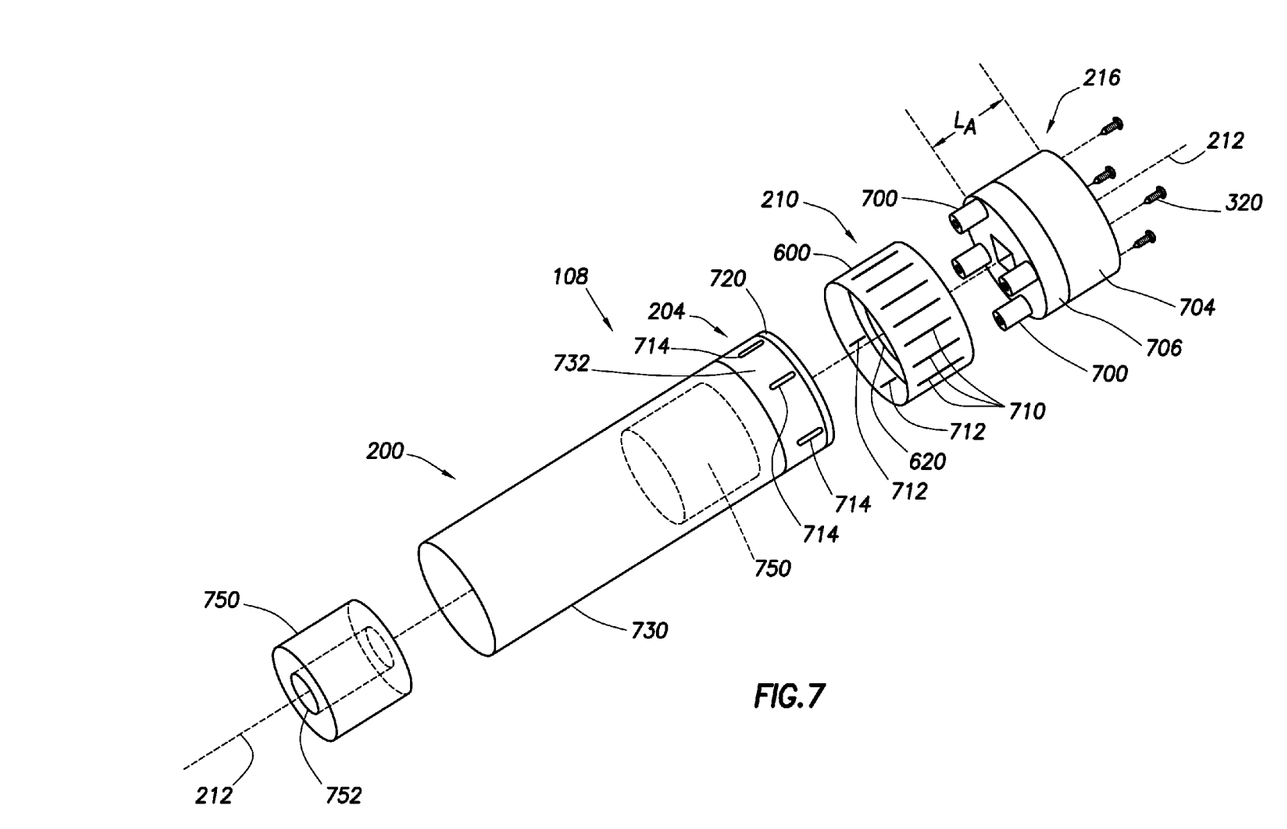
FIG. 7 shows a perspective exploded view of the connector assembly in accordance with at least some embodiments.

FIG. 7 shows an exploded perspective view of the connector assembly 108 in accordance with at least some embodiments. In particular, FIG. 7 shows the lower shaft member 200, the cam member 210, top cap 216, and bushing member 750. Bushing member 750 resides within the internal volume of the lower shaft member 200, and an illustrative location of the bushing member 750 when assembled is shown in dashed form. Each of the lower shaft member 200, cam member 204, top cap 216 and bushing member 750 define a coaxial central axis 212. The top cap 216 comprises one or more stem members 700, and as illustrated four such stem members 700. The stem members 700 protrude through the channels 620 of the cam member 210 (only one such channel 620 partially visible in FIG. 7) and the stem members 700 interact with corresponding apertures (not shown in FIG. 7) in the lower shaft member 200. In accordance with at least some embodiments, the stem members 700 also provide a conduit for fasteners 320 to extend from the top cap 216 through the internal diameter of the stem members 700, and into corresponding internally threaded apertures (not shown) in the lower shaft member 200.

The illustrative top cap 216 defines an outer surface 704 which, in the illustrative embodiments of FIG. 7, defines a circular cross-section that, in some embodiments, has an outside diameter of approximately 2.7 centimeters (cm). Other outside diameters may be equivalently used. Further, in accordance with at least some embodiments, the outer surface defines an area of reduced outside diameter 706, corresponding to the portion of the top cap 216 that telescopes within the internal diameter of the cam member 210. In some embodiments the reduced outside diameter may be approximately 1 millimeter (mm) smaller than the larger outside diameter; however, the reduced diameter portion 706 may be larger or smaller, and in other cases outside diameter of the top cap 216 may be uniform across its axial length.

In accordance with at least some embodiments, the top cap 216 is constructed of a high density plastic material. In some embodiments, the top cap 216 may be created by a casting method. In other embodiments, however, particularly embodiments where the top cap will be subject to high stress or impact loads, the top cap 216 may be metallic. In accordance with at least some embodiments the axial length of the top cap 216 (the axial length labeled $L_A$ in FIG. 7) is approximately 1.9 cm, but other axial lengths may be equivalently used. In any event, the axial length $L_A$ corresponds to the axial length $L_I$ (FIG. 5). The stems 700 may each extend beyond the lower end of the top cap 216 by approximately 5 mm. Moreover, in the illustrative embodiments each stem 700 defines a circular cross-section, has an outer diameter of approximately 5 mm, and an internal diameter of approximately 3 mm.

Still referring to FIG. 7, the cam member 210 in at least some embodiments further comprises a series of longitudinal ridges 710 on the outside diameter to help a user grip the cam member 210 when moving the cam member from one rotational orientation to another. However, the longitudinal ridges 710 are merely illustrative, and any surface irregularity which increases the ability to grasp and hold the cam member 210 may be equivalently used (e.g., longitudinal grooves, knurled surface).

In accordance with at least some embodiments, the cam member 210 further comprises one or more detent members 712 on the inside diameter. The illustrative detent members 712 are aligned longitudinally and parallel to the central axis 212. A corresponding set of detent members 714 reside on the outside diameter of the lower shaft member 200 such that, when the cam member 210 is telescoped over the lower shaft member 200, the detent members 712 interact with the detent members 714. In accordance with a least some embodiments, the detent members interact as the rotational orientation of the cam member 210 changes to provide tactile feedback to a user as to the rotational orientation of the cam member 210. Moreover, the detent members 712 and 714 in some embodiments may act to reduce unwanted rotational of the cam member 210. As illustrated in FIG. 7, the detent member 712 may be longitudinal ridges, and the detent members 714 may be longitudinal grooves, but the location of the grooves and ridges may be equivalently swapped. Moreover, either the cam member 210 or the lower shaft member 200 may comprise both ridges and grooves so long as the ridges and grooves on the adjacent components are such that a ridge aligns with a groove. In accordance with yet still further embodiments, the detent members may be implemented as between the cam member 210 and the top cap 216.

The cam member 210 in accordance with at least some embodiments is metallic, and in a particular embodiment the cam member 210 is zinc. Other metallic substances may be equivalently used, for example aluminum or steel. In accordance with at least some embodiments, the basic form of the cam member 210 is cast in zinc. In cases where the cam member 210 is cast, some or all of the aperture 608 and/or the channels 620 may be made by machining the cam member 210 after it is removed from the mold. In yet still other embodiments, the entire cam member 210 may be created by a machining process. In further embodiments still, the cam member may be made from any suitable material, including high density plastics. In accordance with at least some embodiments, the cam member 210 has an axial length of approximately 1.8 cm, define an internal diameter of approximately 2.6 cm and an outside diameter of approximately 2.8 cm. The plate 606 may have a thickness of approximately 2 mm.

Still referring to FIG. 7, the lower shaft member 200 further comprises flange member 720 coupled to the distal end 204. The flange member 200 defines a plane that is perpendicular to the central axis 212. Within the flange member 720 resides an aperture (not visible in FIG. 7) congruent with the apertures in the cam member 210, and in some cases congruent with the aperture 300 in the top cap 216. The flange member 720 also comprises smaller apertures (again not visible) within which the stems 700 of the top cap 216 interact. Various aspects of the flange member 720 are discussed more below with respect to FIG. 8.

The lower shaft member 200 defines an outer surface 730 which, in the illustrative embodiments of FIG. 7, defines a circular cross-section. In some embodiments, the outer surface 730 has an outside diameter of approximately 2.7 cm. Other outside diameters may be equivalently used. Further, in accordance with at least some embodiments, the outer surface defines an area of reduced outside diameter 732, corresponding to the portion of the lower shaft member 200 that telescopes within the internal diameter of the cam member 210. In some embodiments the reduced outside diameter 732 may be 1 mm smaller than the larger outside diameter 730; however, the reduced diameter portion 732 may be larger or smaller, and in other cases outside diameter of the lower shaft member 200 may be uniform across its axial length.

In accordance with at least some embodiments, the lower shaft member 200 is constructed of a high density plastic material. In some embodiments, the lower shaft member 200 may be created by a casting method. In other embodiments, however, particularly embodiments where the connector assembly will be subject to high stress or impact loads, the lower shaft member 200 may be metallic. In accordance with at least some embodiments the axial length of the lower shaft member 200 is approximately 5.8 cm, but other axial lengths may be equivalently used. Further still, the lower shaft member 200 may comprise individual components coupled together to form the lower shaft member 200. For example, the flange member 720 may be created separately, and then coupled together in any suitable form (e.g., threaded connection, a glued connection, or both).

Still referring to FIG. 7, bushing member 750 telescopes within the lower shaft member 200 and is held rigidly in place, such as by a glue joint coupling with the lower shaft member 730. The bushing member 750 defines a central bore 752, where the central bore 752 defines a central axis coaxial with axis 212. The central bore 752 may extend through the bushing member 750 as shown, or the central bore 752 may only extend partially through, with the entrance aperture to the central bore facing the top cap 216. In a particular embodiment, the alignment stem 530 of the implement 110 telescopes into the bushing member 750 as the implement is being inserted. In some cases, though not strictly required, the bushing member 750 and alignment stem 530 act to aid in alignment for insertion. In other cases, the bushing 750 and alignment stem 530 provide support for torque loads applied to the implement 110.

Figure 8:
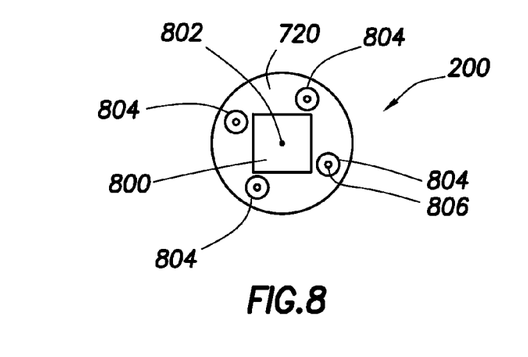
FIG. 8 shows an overhead view of the lower shaft member in accordance with at least some embodiments.

FIG. 8 shows an overhead view of the lower shaft member 200 in accordance with at least some embodiments. As illustrated, the lower shaft member 200 comprises the flange member 720. The flange member 720 defines an aperture 800. The aperture 800 defines a central axis 802 that, when the connector assembly is assembled is coaxial with axis 212. The aperture 800 is a quadrilateral, and more particular a square, congruent with the aperture 608 in the cam member 210 (FIG. 6), and in some cases congruent with the aperture 300 in the top cap 216 (FIG. 3). Moreover, the shape of the aperture 800 matches the cross-sectional shape of the first insert portion 256, but the aperture 800 is not congruent with the cross-sectional shape of the first insert portion 256, as the insert portion 256 is slightly smaller to enable the stem member 254 to telescope through the aperture 800.

The lower shaft member 200 further comprises a plurality of apertures 804. The apertures 804 define inside diameters such that the stems 700 (FIG. 7) on the top cap 216 telescope into the apertures 802 when the connector assembly 108 is assembled. Moreover, within each aperture 804 resides an internally threaded aperture 806, into which the respective illustrative fasteners 320 couple.

Figure 9:
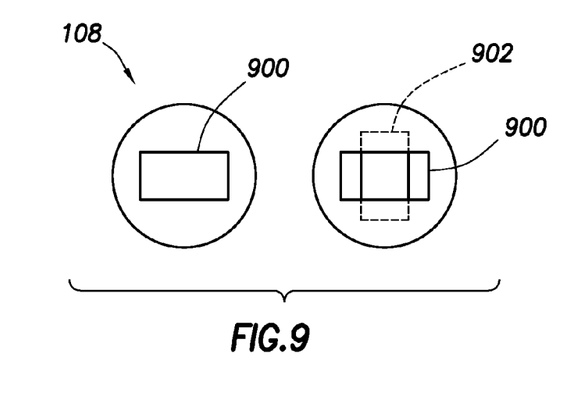
FIG. 9 shows a simplified overhead view of a connector assembly in accordance with at least some embodiments.

The various embodiments discussed to this point have all used apertures being quadrilaterals, and more particularly a squares. However, a variety of cross-sectional shapes of the apertures may be equivalently used. For example, FIG. 9 shows a simplified overhead view of the connector assembly 108 where the apertures 900 are quadrilaterals, and more particularly rectangles. In the illustrative embodiments of FIG. 9, rotation of the cam member (not specifically shown in FIG. 9) results in misalignment of the rectangular aperture in the cam member as shown by the right hand diagram in FIG. 9 (with a portion of the aperture 902 visible in the aperture 900), and the otherwise hidden portions of the aperture 902 of the cam member shown in dashed lines.

Figure 10:
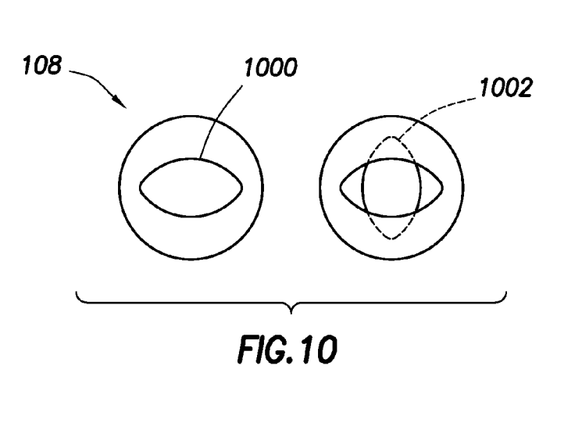
FIG. 10 shows a simplified overhead view of a connector assembly in accordance with at least some embodiments.

Further still, the apertures need not be polygons, and even apertures defining an oval cross-section may be used as shown in FIG. 10. In particular, FIG. 10 shows an overhead view of a connector assembly 108 where the apertures 1000 are ovals. In the illustrative embodiments of FIG. 10, rotation of the cam member (not specifically shown in FIG. 10) results in misalignment of the oval aperture in the cam member as shown by the right hand diagram in FIG. 10 (with a portion of the aperture 1002 visible in the aperture 1000), and the otherwise hidden portions of the aperture 1002 of the cam member shown in dashed lines. More generally then, so long as the misalignment of the congruent aperture in the cam member can interact with a shoulder created in the shoulder area of the stem member, the implement 110 may be locked within the connector assembly.

Figure 11:
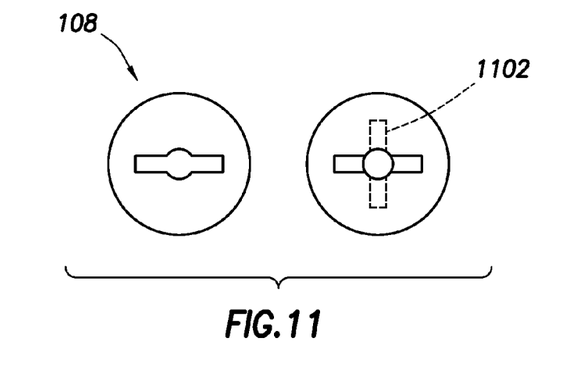
FIG. 11 shows a simplified overhead view of a connector assembly in accordance with at least some embodiments.

Yet further still, the apertures may take the form of a combination of geometric shapes, as shown in FIG. 11. In particular, FIG. 11 shows an overhead view of a connector assembly 108 where the apertures 1100 are bar-ball or key-hole shaped. In the illustrative embodiments of FIG. 11, rotation of the cam member (not specifically shown in FIG. 11) results in misalignment of the key-hole aperture in the cam member as shown by the right hand diagram in FIG. 11 (with a portion of the aperture 1102 visible in the aperture 1100), and the otherwise hidden portions of the aperture 1102 of the cam member shown in dashed lines. More generally then, so long as the misalignment of the apertures in the cam member can interact with a shoulder created in the shoulder area of the stem member, the implement 110 may be locked within the connector assembly.

Figure 12:
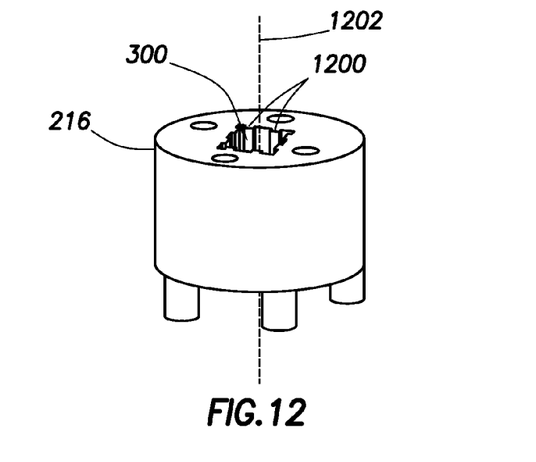
FIG. 12 shows a perspective view of a top cap in accordance with at least some embodiments.
Figure 13:
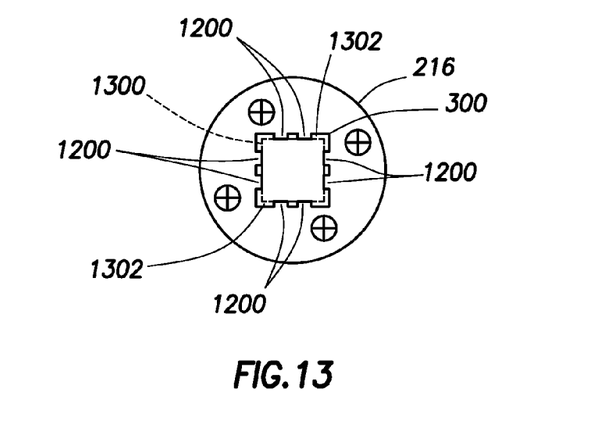
FIG. 13 shows an overhead view of a top cap in accordance with at least some embodiments.

In some embodiments, the connector assembly 108, when coupled to a pole 100, may form a partially sealed volume, with the apertures though the top cap 216, cam member 210 and flange member 720 being the only location out which air can escape. In such situations, insertion of the stem member 254 into the connector assembly 108 may cause displacement of air in the lower shaft member 200 that tends to oppose insertion of the stem 254. In other words, if the air within the lower shaft member 200 displaced by the stem member 254 has no place to escape, insertion of the stem 254 may cause an increase in air pressure which creates forces that oppose the insertion. In order to at least partially address the air displacement issue, in accordance with at least some embodiments the aperture 300 in the top cap 216 comprises a series of longitudinal ridges which thus define areas out which air can escape. In particular, FIG. 12 shows a perspective view of the top cap 216 where the aperture 300 comprises longitudinal ridges 1200 (not all such ridges 1200 visible), where the longitudinal ridges 1200 are parallel with the central axis 1202. The longitudinal ridges 1200 define zones out which air can escape during insertion of a stem member 254, thus reducing the build up air pressure win the lower shaft member. The zones out which air can escape are more easily seen with respect to FIG. 13, which shows an overhead view of the top cap 216 including the longitudinal ridges 1200, and FIG. 13 also shows a cross-section 1300 of a stem member 254 inserted within the aperture 300. In particular, the offset created between the cross-section 1300 of the stem member 254 and the aperture 300 defines zones 1302 out which air can escape during insertion of the stem member 254.

In accordance with further embodiments, the longitudinal ridges 1200 may be alternatively implement as longitudinal slots, in which case the zones 1302 thus are the longitudinal slots. Moreover, the longitudinal ridges 1200 may also be implemented on the aperture 608 of the cam member 210 and/or the aperture 800 of the flange member 720 of the lower shaft member 200. However, the inventor of the present specification has found that longitudinal ridges 1200 residing only on the top cap 216 are sufficient to address the air displacement issues. Finally, it is noted that while presented in terms of air displacement during insertion of the stem member 254, the longitudinal ridges 1200 may serve an equal purpose with respect to air movement during removal of the stem member 254 from the connector assembly 108. The presence of longitudinal ridges 1200 to define zones 1302 shall not negate the status of an aperture as being a particular shape. For example, for purposes of the specification and claims the illustrative square aperture 300 of FIG. 13 shall still be considered square in spite of the presence of the longitudinal ridges 1200.

Figure 14:
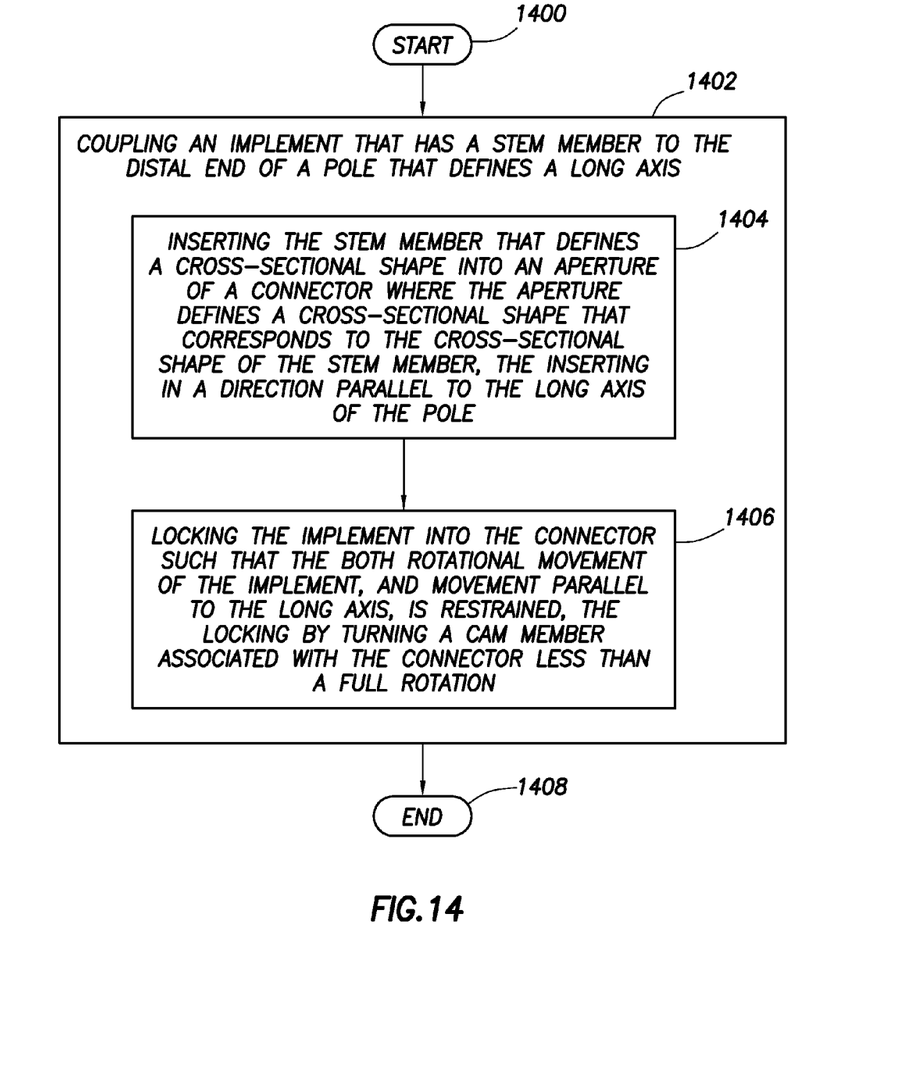
FIG. 14 shows a method in accordance with at least some embodiments.

FIG. 14 shows a method in accordance with at least some embodiments. In particular, the method starts (block 1400) and comprises coupling an implement that has a stem member to the distal end of a pole that defines a long axis (block 1402). The coupling further comprises inserting the stem member that defines a cross-sectional shape into an aperture of a connector where the aperture defines a cross-sectional shape that corresponds to the cross-sectional shape of the stem member, the inserting in a direction parallel to the long axis of the pole (block 1404); and then locking the implement into the connector such that the both rotational movement of the implement, and movement parallel to the long axis, is restrained, the locking by turning a cam member associated with the connector less than a full rotation (block 1406). Thereafter, the method ends (block 1408).

The above discussion is meant to be illustrative of the principles and various embodiments of the present invention. Numerous variations and modifications will become apparent to those skilled in the art once the above disclosure is fully appreciated. For example, the stems 700 may equivalently extend from the lower shaft member 200 to the top cap 216. It is intended that the following claims be interpreted to embrace all such variations and modifications.

What is claimed is:

1. A connector for a utility pole comprising:
   a cylindrical outer wall that defines a circular cross-section, an outside diameter, an inside diameter defining an interior volume, a central axis, and a distal end;
   a flange portion disposed on the distal end, and the flange portion defines an aperture that opens into the interior volume, the aperture having a central axis coaxial with the central axis of the cylindrical outer wall;
   a cam member comprising:
      an outer body that defines an exterior surface on an outside diameter, an inside diameter defining an internal volume, and an axial length along a central axis, the central axis coaxial with the central axis of the flange portion;

the inside diameter of the outer body telescoped over the flange portion for a distance less than the axial length of the outer body, and the inside diameter of the outer body also telescoped over the outside diameter of the outer wall;

a plate member coupled to the inside diameter of the outer body and that defines a non-zero axial length less than the axial length of the outer body, the plate member disposed within the internal volume of the outer body, and abutting the flange portion;

an aperture through the plate member congruent with the aperture of the flange portion;

wherein in a first rotational orientation of the cam member the aperture of the cam member rotationally aligns with the aperture of the flange portion, and in a second rotational orientation the aperture of the cam member is rotationally misaligned with the aperture of the flange portion;

a top cap, distinct from the flange portion, the top cap coupled in a rotationally fixed orientation relative to the flange portion, the top cap telescoped within the inside diameter of the outer body of the cam member, the top cap coupled to the cylindrical outer wall, and the top cap defines an aperture rotationally aligned with the aperture of the flange portion of the cylindrical outer wall; and wherein the top cap has an interior wall that defines the aperture of the top cap, and the interior wall comprises at least one selected from the group consisting of: a plurality of longitudinal ridges parallel to the central axis of the cylindrical outer wall; a plurality of longitudinal slots parallel to the central axis of the cylindrical outer wall.

2. The connector of claim 1 further comprising a means for gripping the cam member disposed on the exterior surface of the outer body.

3. The connector of claim 1 wherein each aperture defines a polygon.

4. A connector for a utility pole comprising:

a cylindrical outer wall that defines a circular cross-section, an outside diameter, an inside diameter defining an interior volume, a central axis, and a distal end;

a flange portion disposed on the distal end, and the flange portion defines an aperture that opens into the interior volume, the aperture having a central axis coaxial with the central axis of the cylindrical outer wall;

a cam member comprising:
an outer body that defines an exterior surface on an outside diameter, an inside diameter defining an internal volume, and an axial length along a central axis, the central axis coaxial with the central axis of the flange portion;

the inside diameter of the outer body telescoped over the flange portion for a distance less than the axial length of the outer body, and the inside diameter of the outer body also telescoped over the outside diameter of the outer wall;

a plate member coupled to the inside diameter of the outer body and that defines a non-zero axial length less than the axial length of the outer body, the plate member disposed within the internal volume of the outer body, and abutting the flange portion;

an aperture through the plate member congruent with the aperture of the flange portion;

wherein in a first rotational orientation of the cam member the aperture of the cam member rotationally aligns with the aperture of the flange portion, and in a second rotational orientation the aperture of the cam member is rotationally misaligned with the aperture of the flange portion;

a top cap, distinct from the flange portion, the top cap coupled in a rotationally fixed orientation relative to the flange portion, the top cap telescoped within the inside diameter of the outer body of the cam member, the top cap coupled to the cylindrical outer wall, and the top cap defines an aperture rotationally aligned with the aperture of the flange portion of the cylindrical outer wall; and a channel defined in the plate member, the channel distinct from the aperture in the plate member, the channel spanning less than half a circumferential length around the aperture of the plate member, and the channel defining a first end and an opposite second end; and a stem extending between the top cap and the flange portion, the stem extending through the channel;

wherein in the first rotational orientation of the cam member the stem abuts the first end of the channel, and in the second rotational orientation the stem abuts the second end of the channel.

5. The connector of claim 4 wherein each aperture defines a quadrilateral.

6. The connector of claim 4 wherein each aperture defines an oval.

7. The connector of claim 4 further comprising:
a first and second detent member on an outer portion of the outer wall; and
a third detent member on the inside diameter of the outer body of the cam member;
wherein interaction of the third detent member with the first or second detent member provides tactile feedback as to the rotational orientation of the cam member relative to the shaft member.

8. The connector of claim 4 further comprising a bushing, the bushing defines a central bore, the bushing telescoped within the interior volume defined by the cylindrical outer wall.

9. The connector of claim 8 wherein the bushing further supports a torque load against an inner wall defined by the central bore of the bushing in a configuration where a stem member is inserted through the cam member and flange portion.

10. The connector of claim 4 wherein the axial length of the outer body of the cam member is approximately 9 times the axial length of the plate.

11. The connector of claim 4 wherein the top cap defines an outside diameter and an axial length coaxial with the central axis of the outer wall.

12. The connector of claim 11 wherein the axial length of the top cap is approximately 70% of the outside diameter of the top cap.

13. The connector of claim 4 further comprising a means for venting air during insertion of a stem member into the connector.

14. The connector of claim 4 wherein the plate is medially disposed along the axial length of the outer body.

* * * * *